Oct. 6, 1970        H. E. RIORDAN                3,532,393
                 ANTI-SKID BRAKING SYSTEM
Filed Oct. 29, 1968                        3 Sheets-Sheet 2
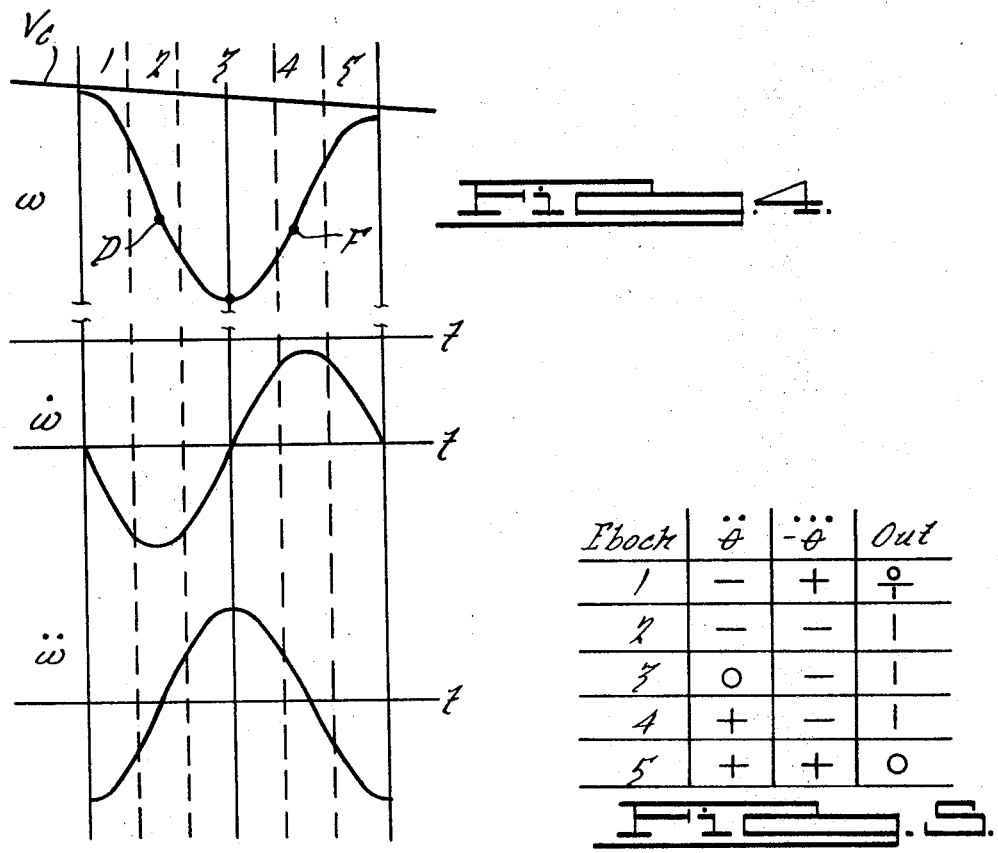
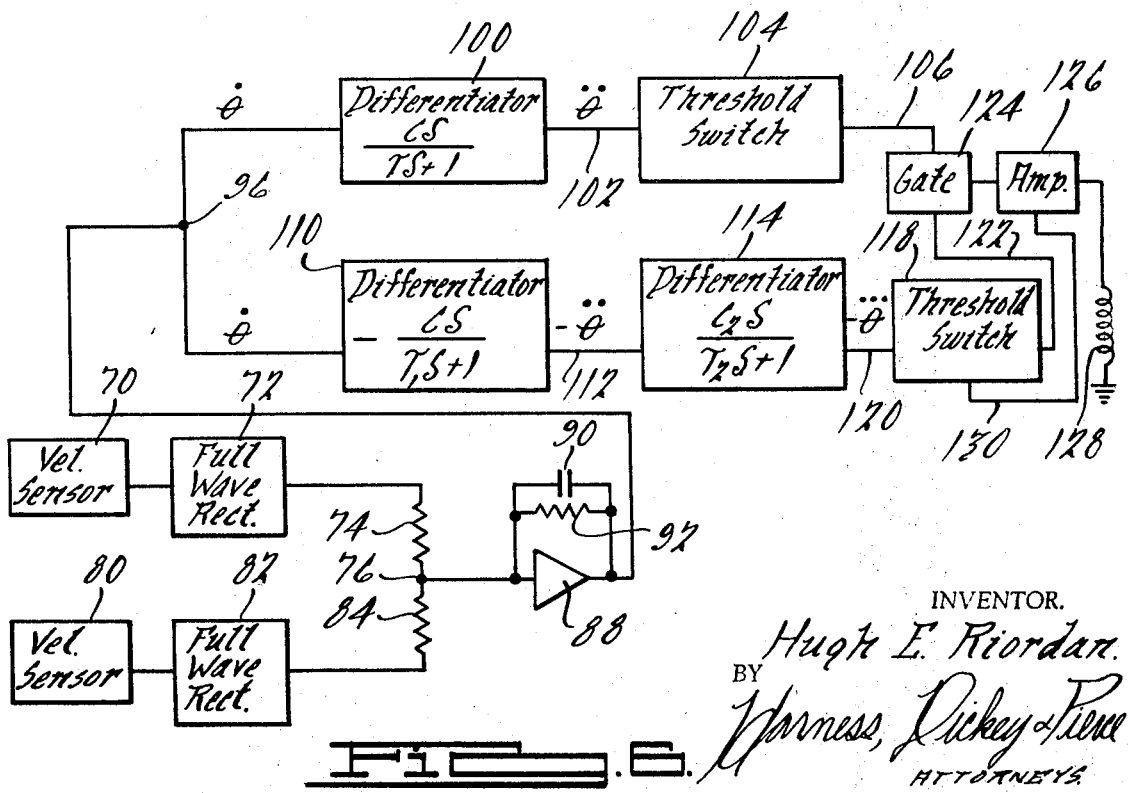
INVENTOR.
Hugh E. Riordan
BY Harness, Dickey & Pierce
ATTORNEYS

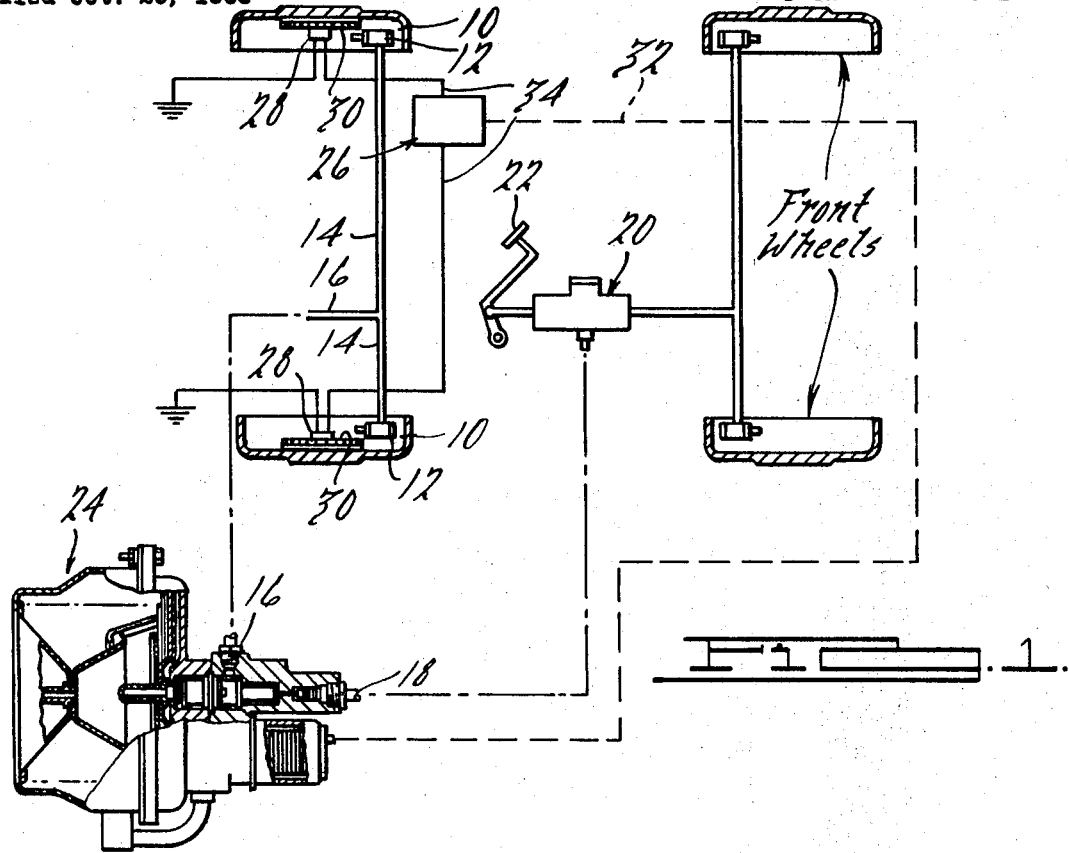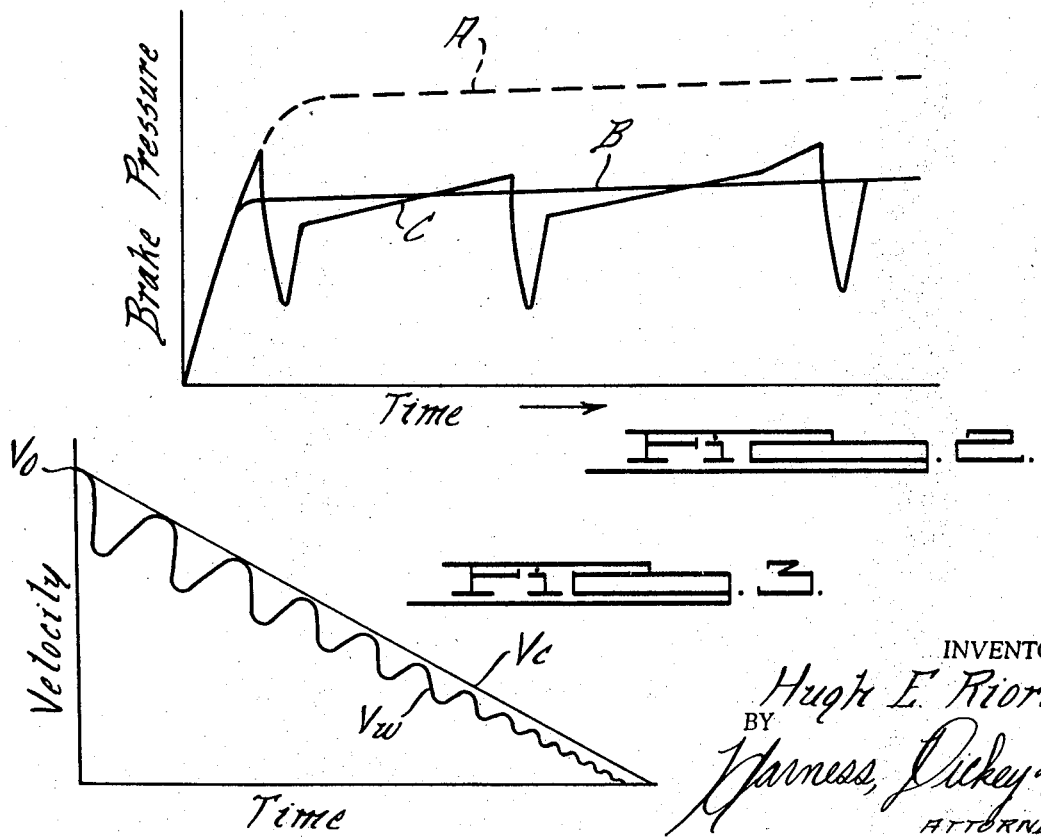

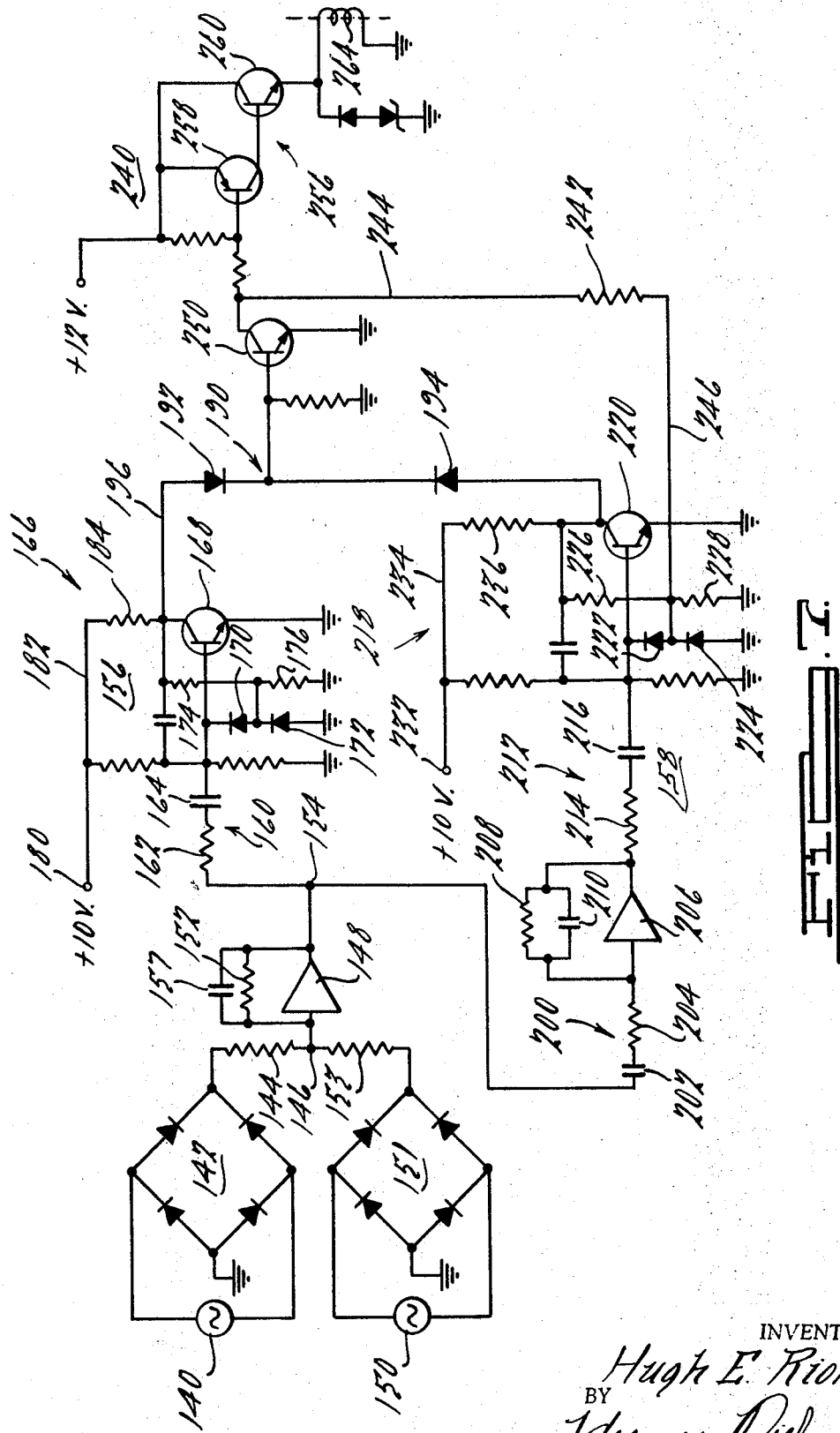

United States Patent Office 3,532,393
Patented Oct. 6, 1970

3,532,393
ANTI-SKID BRAKING SYSTEM
Hugh E. Riordan, Wyckoff, N.J., assignor to Kelsey-Hayes, Romulus, Mich., a corporation of Delaware
Filed Oct. 29, 1968, Ser. No. 771,531
Int. Cl. B60t 8/08
U.S. Cl. 303—21                                   15 Claims

ABSTRACT OF THE DISCLOSURE

A system for controlling the braking of a wheeled vehicle to prevent skidding in which the braking effect applied to the vehicle wheel is effectively responsive to the rate of change of the braking force relative to wheel slip so that such rate of change is maintained substantially at or near zero during the braking operation under all road conditions, the approach of this zero rate of change being represented by a first polarity control signal generated in response to a preselected polarity of an angular wheel acceleration signal and a change in polarity of the rate of change of the wheel acceleration as the zero rate is approached from one direction, or a second polarity control signal generated in response to a preselected magnitude of angular wheel deceleration as the zero rate is approached from the other direction.

BACKGROUND AND SUMMARY OF THE INVENTION

This invention relates geenrally to vehicle braking systems and, more particularly, to braking control means for preventing wheel skidding and for minimizing stopping distances while simultaneously maintaining directional stability.

For purposes of describing the system of the present invention, the term "slip" refers to a characteristic of the rotating element whereby the element rotates at less than is free rolling speed when a braking force or torque is applied. The term "skid," or "slide" refers to a locked wheel condition.

One of the major difficulties which arises in braking a moving vehicle, such as an automobile, an aircraft or other wheeled vehicle, occurs when the braking wheel, or wheels, "lock up," this "lock up" tending to create an unstable condition in the controlled motion of the vehicle. Wheel lock up may cause such a loss in directional stability as to result in an uncontrolled skidding or sliding while at the same time the presence of locked wheels generally increases the distance required due to the reduced coefficient of friction while skidding. Under most road conditions, if skidding can be prevented the vehicle can usually be stopped more safely in a shorter distance.

A skid control system has been evolved which is effective under various road conditions while utilizing a relatively simple computational system. This system, disclosed in copending application by Ronald S. Scharlack, Ser. No. 769,035 filed Oct. 21, 1968, takes into account the changing road conditions which result in a change in the coefficient of friction. In the system of the copending application, the velocity of the braking wheel, or wheels, is sensed by appropriate angular speed sensing devices. By utilizing simple gating logic, circuit elements responsive only to changes in the polarities of such output signals, a control signal can be produced and applied to the braking system of the vehicle for providing effective operation around the most efficient performance point of the overall braking system. To maximize efficiency, the system of the invention is arranged to maintain a minimum rate of change of braking force as a function of slip so that ideally such rate of change is always maintained substantially at or near zero independently of the road conditions which exist. For further details, reference is made to the disclosure of the copending application which is incorporated herein by reference.

In considering a wheeled vehicle, the expression describing the torque factors acting on each wheel is as follows:

$$T_B = I\dot{\omega} + \mu F_n R$$
$$T_B = I\dot{\omega} + \mu F_t R$$

where $T_B$ = Brake torque
$\mu$ = Coefficient of friction between tire and road
$F_n$ = Normal force of tire on the road
$F_t$ = Tangential force between tire and road
$R$ = Rolling radius of tire
$I$ = Movement of inertia of tire and wheel
$\dot{\omega}$ = Angular deceleration of tire In order to optimize the brake operation, it is desired to maximize the brake force, which is the optimum slip condition on the brake force versus slip curve described in the copending Scharlack application. This condition occurs when the wheel achieves maximum spin-up or maximum acceleration for the particular conditions encountered. In order to sense this maximum acceleration, the system of the present invention generates a rate of change of acceleration signal, which, when at zero, indicates a maximum acceleration or deceleration.

Under the conditions where the wheel is spinning up or acceleration, the brake pressure is known to be either zero or a constant depending on the particular system being utilized. Accordingly, the term for the brake torque ($T_B$) may be assumed to be zero or a constant. Thus, the first derivative of the torque expression is $F_t R = O + I\ddot{\omega}$, the derivative of the brake torque being zero for either a zero or constant brake pressure. Accordingly, the first derivative of the brake force is proportional to the rate of change of acceleration ($\dot{F} \sim \ddot{\omega}$) after eliminating the effect of the constant wheel mass. To maximize the braking force (optimum slip on the brake force versus slip curve), the rate of change of acceleration must be at a zero point when the wheel is accelerating, this point being at the point of maximum brake force. However, the fluid inertia of the system precludes the instantaneous application of the brakes. Accordingly, the system tends to overshoot the maximum brake force point.

When the wheel begins to decelerate with the brake applied, the brake torque is not a constant or zero. Thus, the assumption made in connection with the spin-up portion of the cycle is no longer valid. Accordingly, the deceleration signal generated within the control system is monitored and the brake control system is triggered to the "on" condition when a preselected deceleration is reached which is indicative of an incipient skid condition.

While the above described system is extremely effective to accomplish the above results and provides a system which alleviates the shortcomings of the prior art systems, it has been found that the basic principles of the copending application may be utilized while further reducing cost, complexity, and manufacturing and installation time. The system of the present invention reduces the number of elements required to provide all of the information necessary to effectively operate the skid control system of the present invention and accomplish essentially maximum efficiency and optimum operation of the braking system.

Accordingly, it is one object of the present invention to provide an improved system for operating the brake of a wheeled vehicle.

It is another object of the present invention to provide an improved skid control system for the brake or brakes of a wheeled vehicle.

It is a further object of the present invention to provide an improved brake control system of the type described which is capable of eliminating skidding or sliding of the braked wheel by sensing the angular velocity of the braked wheel.

It is still a further object of the present invention to provide an improved skid control system for the brake of a vehicle which is simple and inexpensive to manufacture and install, and is reliable in use.

Further objects, features and advantages of this invention will become apparent from a consideration of the following description, the appended claims and the accompanying drawings in which:

FIG. 1 is a schematic diagram illustrating a representative vehicle brake system which may be utilized in conjunction with the control system of the present invention;

FIG. 2 is a schematic diagram illustrating the brake pressure versus time relationship of a brake assembly which is adapted to be utilized in conjunction with the control system of the present invention;

FIG. 3 is a graph illustrating the velocity versus time relationship of the vehicle velocity curve and the wheel angular velocity curve of the skid control system of the present invention;

FIG. 4 is a representative variation of a portion of FIG. 3 and further includes a graph of the first and second derivative of the portion of FIG. 3;

FIG. 5 is a chart of the polarity of signs of the various portions of FIG. 4;

FIG. 6 is a block diagram illustrating a circuit for accomplishing the features of the present invention; and FIG. 7 is a schematic diagram of preferred circuit elements for the block diagram of FIG. 6.

The skid control system of the present invention is particularly adapted to be utilized and will be described specifically for use with an automotive vehicle. However, it should be understood that the features of the invention may be utilized with other types of vehicles including aircraft and other wheeled vehicles which are adapted to provide braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Referring now to FIG. 1, there is illustrated, in schematic form, a skid control system which may be utilized in conjunction with the rear wheels of an automotive vehicle, the rear wheels of the vehicle including brake drums 10 and wheel brake cylinders 12. The brake cylinders 12 are operated by applying pressure through hydraulic lines 14 which are connected to a common fluid line 16, the pressure being supplied by a master cylinder assembly 20 of conventional construction and manually actuated through a foot pedal 22. The fluid pressure from master cylinder 20 is controlled by means of a modulating valve 24 connected between the fluid lines 16 and 18. Thus, the modulating valve 24 controls the fluid pressure to the wheel brake cylinders and ultimately the operation of the brakes. The specific details of the brake assembly and brake drum have been omitted to further simplify the disclosure.

The modulating valve 24 in the present system is actuated in accordance with the electrical signal obtained from electrical control module 26, the control module in its preferred form being that illustrated in FIGS. 6 and 7. The module 26 receives information from wheel velocity sensors 28 which are associated with each of the brake drums 10 by means of a rotating element 30 for sensing the angular velocity of the wheel. Any suitable wheel velocity sensor may be utilized with the system of the present invention and accordingly, the details of the sensor 28 and rotating element 30 also have been omitted for simplicity.

As will be explained hereinafter, the control module 26 is constructed to sense the velocity and changes in velocity of the wheel as generated by the sensor 28 and provide an output signal in response to the magnitude of the rate of change of velocity of the wheels reaching a preselected value in the case of releasing brake pressure and the rate of change of acceleration reaching a particular point in the case of reapplying the brake pressure. The output or control signal is transmitted, by means of conductor 32, to the modulating valve 24. In the system of the present invention the control module 26 provides an "on" or "off" signal and control of the fluid pressure to the brake cylinders 12 will be provided by this modulating effect. It is to be understood that this system is merely shown for illustrative purposes and other hydraulic or electric systems may be utilized with the control system of the present invention.

Referring now to FIG. 2, there is illustrated a graph depicting the brake pressure versus time relationship which can be achieved in a skid control system utilizing the features of the present invention. Curve A illustrates the relationship of brake fluid pressure versus time for a conventional brake system in which the pressure is increased from zero to the maximum fluid pressure available in the system. Under certain road conditions, application of maximum brake pressure will result in a skidding. As stated above, if the vehicle wheels are locked, the effectiveness of the brake system in stopping the vehicle is reduced. It has been theorized that the most effective braking can be realized when the wheel slip is maintained between 10 and 20%.

The brake pressure curve for braking the vehicle at the desired slip, hence utilizing maximum coefficient of friction, is designated curve B and any brake pressure above curve B will result in excessive wheel slip and may ultimately result in skidding. It can be seen that the curve B is below the maximum obtainable pressure of the system, thus indicating that the system must be controlled to produce less than a maximum braking force on the wheel in order to stop the vehicle in the shortest distance.

In a modulating valve system incorporating the features of the present invention, the modulating valve 24 responds to the "on" or "off" output signal from the control module 26 to provide for a modulation of the brake pressure, illustrated as curve C. The curve C approximates the ideal brake pressure curve and hence provides a characteristic for stopping the vehicle in the shortest possible distance. The specific details of the modulating system are described in application of Every et al., Ser. No. 642,861, filed June 1, 1967, for Skid Control System and assigned to the assignee of the instant application. Specific reference to this application is made herein and the details thereof are incorporated by reference.

Referring now to FIGS. 3 and 4, there is illustrated a graph of the ideal conditions between wheel velocity and vehicle velocity desired to stop the vehicle in the shortest distance and avoiding skidding of the wheels. The curve of FIG. 3 illustrates the velocity of the vehicle $Vc$ and variation of the velocity of the wheel $Vw$ as produced by modulating the brake pressure of the wheel in accordance with the present invention. It is seen that the brakes are applied at a particular velocity ($Vo$) and the vehicle starts to decelerate along the curve Vc. However, the wheel velocity immediately starts to decrease at a more rapid rate, along curve Vw, and will ultimately start skidding to decrease the wheel velocity to zero if the condition is permitted to persist.

However, at point D on the curve, corresponding to a preselected magnitude of deceleration of the wheel selected for purposes of illustration, the brake pressure is released and the wheel is permitted to spin-up. The start of the spin-up portion is indicated at the point E of the wheel velocity curve and is lower than point D due to the hydraulic inertia of the system causing a delay in the dropping of the brake pressure to zero or some low fixed value. At a certain rate of change of the spin-up or acceleration (point F), the brake pressure is again applied and the wheel is caused to run-down or decelerate. In the situation of the instant application, the point D is selected by sensing the deceleration and, when the deceleration reaches a preset value, the brake pressure is relieved. On the other hand, the spin-up point or point F is selected by sensing the sign of the wheel acceleration, and also sensing the change in sign of the rate of change of wheel acceleration and correlating this information. This latter point (F) corresponds to the point of maximum brake force on the brake force versus slip curve described above and illustrated in Scharlack application, Ser. No. 626,626.

Thus, the idealized braking curve is closely approximated by generating a signal which is indicative of the magnitude of deceleration of the wheel and releasing brake pressure at such time as the magnitude of deceleration reaches a certain value and on spin-up to correlate the wheel acceleration with the wheel rate of change of acceleration to signal the system to reapply brake pressure. Thus, the brake is successively applied and released to permit the vehicle to decelerate at an idealized rate.

FIG. 4 illustrates the portion of the curve of FIG. 3 between lines A and B and designates the points D and F wherein the brake pressure is released and reapplied, respectively. The middle portion of FIG. 4 is a graph illustrating the first derivative of the angular velocity of the wheel, thus providing a curve of the angular acceleration of the wheel as related to time. The lower portion of FIG. 4 illustrates the curve representing the second derivative of the angular velocity of the wheel or the rate of change of acceleration of the wheel as related to time. The upper, middle and lower curves have been broken down into five periods designated 1, 2, 3, 4 and 5. Thus, through the process of differentiating the angular velocity of the wheel, the angular acceleration and rate of change is acceleration of the wheel may be derived.

FIG. 5 is a chart illustrating the sign of the three curves in the respective periods designated 1, 2, 3, 4 and 5 for each of the angular velocity, angular acceleration and rate of change of angular acceleration.

Referring now to FIG. 6, there is illustrated a schematic block diagram of one system which is capable of performing the objects of the present invention. Particularly, a wheel velocity sensor 70 for one of the rear wheels provides an output signal, the amplitude of which varies in accordance with the speed of the particular wheel being sensed. The output of the wheel velocity sensor 70 is fed through a full wave rectifier circuit 72 to a first summing resistor 74 connected to a node 76. The opposite rear wheel velocity is sensed by a second velocity sensor 80, the output of which is fed through a second full wave rectifier 82 to a second summing resistor 84. The resistors 74, 84 are connected in the conventional summing arrangement, the junction 76 of the two resistors providing a signal representative of the average speed of the two wheels, if the resistors 74, 84 are of equal value.

The output of the summing resistors 74, 84 at node 76, provides a direct current voltage which varies as a function of the average speed of the two wheels being sensed. This average DC voltage, which is proportional to speed, is fed through an operational amplifier 88, including feedback capacitor 90 and feedback resistor 92, to a second node 96.

Referring to the upper leg of the circuit, the output signal at node 96 is fed through a first differentiator circuit 100, the differentiator circuit 100 deriving the acceleration or rate of change of velocity with respect to time in accordance with the mathematical expression noted within the block 100. It is seen that the differentiator is responsive to the capacitance and period of the differentiator circuit and includes a delay function, the delay being utilized primarily to filter noise from the velocity signal. The output of the differentiator circuit 100 is impressed on a conductor 102 and fed to a threshold switch circuit 104 providing an output signal on output conductor 106 when the rate of change of velocity or deceleration level is below a preselected value. The preselected magnitude corresponds to the point D described above and the output signal is utilized to release brake pressure and initiate the spin-up cycle.

This output signal may be selected to be a logical zero or logical one level depending on the circuit parameters chosen and the opposite signal will be provided when the threshold level is above that set for the threshold switch 104. In the particular system illustrated, when the input signal on conductor 10 exceeds the reference signal set within the threshold switch 104, the output signal of conductor 106 will be at a zero voltage. On the other hand, when the input signal on conductor 102 is less than the reference voltage set in threshold 104, the output signal on conductor 106 will be at a constant level and may be selected to be either positive or negative as stated above.

The output signal at node 96 is also fed to the lower portion of the circuit which includes a second differentiator 110 which derives the negative rate of change of velocity with respect of time or the negative of the acceleration. As was the case with differentiator 110, the form of the output signal from differentiator 110 is indicated mathematically within the block 110. The output of differentiator 110 is fed to a conductor 112 and to a third differentiator circuit 114 which generates the second differential of the velocity signal or the rate of change of acceleration with respect of time. This output signal is fed to a second threshold switch 118 by means of a conductor 120.

The output signals from the threshold switch 118 is fed to an output conductor 122, the signals of conductor 122 being correlated with the signal on conductor 106 by means of a gate circuit 124. The output of gate 124 is fed through an amplifier 126 to an output device 128, which output device in the particular embodiment illustrated takes the form of a relay coil. The output of the amplifier 126 is fed back as a reference signal to the threshold switch 118 by means of a conductor 130. The feedback signal is utilized to maintain the brakes in the released condition until the proper threshold level for the rate of change of acceleration is achieved.

In operation, the system released the brakes during the first period by sensing the magnitude of the deceleration of the wheels (corresponding to Point D) to provide an output signal on conductor 106 which causes the amplifier to be energized and the output coil 128 to be also energized. Thus, when the threshold switch 104 reaches the preselected magnitude of deceleration, the brake pressure is released through the actuation of the coil 128. This is obvious from the fact that the curve is at the deceleration portion of the cycle and approaching the point to release the brake pressure and stop the deceleration of the wheels. The lower portion of the circuit, including differentiators 110, 114 and threshold switch 118, are also sensing the velocity and deriving acceleration and rate of acceleration signals. However, these signals are rendered inoperative due to the interaction of the feedback signal on conductor 130 and the change of polarity in the rate of change of the acceleration signal. Accordingly, the lower portion of the circuit does not come into play during the deceleration or rundown portion of the cycle, except to enable the output circuit to respond to the upper leg or deceleration magnitude.

The wheels will continue to decelerate due to the inertia of the system but tend to spin-up after a period of deceleration which varies in accordance with the pressure applied and the other parameters of the hydraulic system. During the second, third and fourth periods of the cycle, the brakes remain deenergized due to the feedback circuit and remain deenergized until such time as the rate of change of acceleration reaches a threshold level set by the threshold switch 118. At this particular threshold level the system then switches to reapply the brakes and slow down the rate of acceleration of the wheels and ultimately cause the wheels to start to decelerate. Also, this switching enables the output gate circuit to respond to the threshold switch 104 reaching the preselected magnitude of deceleration. Again when the preselected magnitude of deceleration is reached, the threshold switch 104 takes over the operation of the circuit to release the brake pressure.

From the table of FIG. 5 it is seen that, during the first period, the output signal changes from a zero to a one level denoting a change in output from applied to release brake pressure respectively. Periods two, three and four are indicated to be in a released pressure condition as is seen from the acceleration and rate of change of acceleration signals both being at a minus for second period, being at zero and a minus for third period, being a plus and a minus for the fourth period. However, during the fifth period, the acceleration and the negative of the rate of the change of acceleration are both positive which, because of the configuration of gate 124, provide a zero output signal. This latter signal causes the output amplifier to turn off and permits the coil 128 to release the movable element thereof and reapply brake pressure.

Referring now to FIG. 7, there is illustrated a preferred circuit for carrying out the features of the present invention, the circuit being an expansion of the block diagram described in conjunction with FIG. 6. As was the case with FIG. 6, a signal generator 140, coupled to one of the wheels being sensed, generates an output signal having a characteristic, amplitude in the selected arrangement, which is proportional to the speed of the wheel. This output signal is fed through a full wave bridge circuit 142 to a summing resistor 144, one end of which is connected to an output terminal of the bridge 142 and the other end being connected to a node 146.

The other rear wheel of the vehicle includes a velocity sensor 150 which similarly generates a velocity signal, the amplitude of which varies in accordance with the speed of the wheel. This output signal is fed through a second bridge circuit 151 to a second summing resistor 153, the upper end of which is connected to the node 146 and the lower end being connected to the rectifier 151. As was the case with FIG. 6, the resistors 144, 153 are connected in the conventional summing configuration.

The summing resistors 144, 153 generate a voltage across the combination which is equal to the sum of the velocity of the two wheels, and the midpoint 146 provides a direct current voltage which is proportional to the average velocity of both wheels. This voltage at node 146 is fed through an operational amplifier 148, which includes a feedback capacitor 157 and resistor 152, as is common in the art, the output of the amplifier 148 being fed to a node 154.

The output signals at node 154 are fed through an acceleration signal generating leg 156 at a rate of change of acceleration signal generating leg 158. Specifically, the leg 156 includes a differentiator circuit 160 having a resistor 162 and capacitor 164. The resistor-capacitor combination forms a differentiator circuit having a characteristic of generating an output acceleration signal in accordance with the mathematical expression contained in the block 100 of FIG. 6, the circuit 160 including a provision for a delay to aid in filtering noise from the circuit. The output signal of the differentiator circuit 160 is fed to a threshold switch 166 which includes an output NPN transistor 168 and a biasing circuit for the base electrode of the transistor 168, including a pair of diodes 170, 172 and a voltage divider circuit including resistors 174, 176.

The resistors 174, 176 are connected between the 10 volt potential, at the input terminal 180, and ground by means of a conductor 182 and resistor 184. The center position of the voltage divider is connected to the point between diodes 170, 172. In this way, the operating point of transistor 168 is selected by properly selecting the magnitude of resistors 174, 176. This operating point corresponds to the selection of point D described in conjunction with FIGS. 3 and 4. The output of circuit 166 is fed to an "and" gate circuit 180, including a pair of diodes 192, 194, by means of an output conductor 196.

The rate of change of acceleration leg 158 includes a differentiator circuit 200 which includes a capacitor 202 and a resistor 204. The differentiator circuit 200 generates an output signal which is the negative of the first differentiation (acceleration) of the velocity signal generated at node 154, the signal including a preselected time delay. The circuit 200 has a characteristic of generating an output signal as indicated by the mathematical expression disclosed in block 110 of FIG. 6.

The output form circuit 200 is fed through an operational amplifier 206, including the feedback resistor 208 and feedback capacitor 210, the output of the amplifier 206 being fed to a third differentiator circuit 212, including resistor 214 and a capacitor 216. The circuit 212 is capable of generating the negative rate of change of acceleration wave form for the velocity signal generated at node 154, plus a preselected time delay, the output of the circuit 212 following the mathematical expression given in block 114 of FIG. 6.

The output of circuit 212 is fed through a second threshold switch circuit 218, the threshold switch circuit being substantially identical to that described above in connection with circuit 166 with the exception of a change of certain circuit elements to accommodate the variation in threshold level which is desired. This threshold level is utilized in conjunction with a feedback circuit to be described later and which is used to sense the signal level of the output circuit. Specifically, the output signal of circuit 212 is fed to an output NPN transistor 220, the transistor being controlled by a diode network including first and second diodes 222, 224 and a resistor network including resistors 226, 228. Power for the transistor 220 is supplied from a direct current power supply at input terminal 232, through a conductor 234 and resistor 236. As was the case with the circuit of 156, the output of transistor 220 is fed to the gate 190, and particularly to the diode 194.

The circuit 158 differs from the circuit 156 by the use of a feedback signal from an output amplifier circuit 240. Specifically, a resistor 242 is connected to the output of the amplifier circuit by a conductor 244, and to the junction point between resistors 226, 228 by conductor 246. Thus, the bias of the transistor 220, through diode 222, may be varied in accordance with the output signal being generated at output amplifier 240, and the operation of transistor 220 is accordingly varied. In this way the lower leg is inhibited during the second, third and fourth periods and the upper leg is enabled during the first period to respond to the threshold circuit receiving the preselected deceleration signal.

The output amplifier includes a driver transistor 250, the conduction of which is controlled by means of the gate 190. The output of transistor 250 is fed to a darlington circuit 256 including first and second complementary transistors 258, 260 which are connected in the conventional manner. The output of amplifier circuit 256 is utilized to control the energization of the output relay coil 264, the coil controlling the flow of hydraulic pressure to the brakes.

In operation, the velocity of the wheels are sensed by means of sensors 140, 150 and a direct current signal is generated at node 154 which is proportional to the average of the velocity of the two wheels being sensed by sensors 140, 150. During the first period, the deceleration signal, being generated is fed to transistor 168 and, when the signal reaches a preselected deceleration value, the transistor 168 will be rendered nonconductive. This positive signal at the collector electrode of transistor 168 is fed to gate 190 to cause the gate 190 to turn transistor 250 on. The conduction of transistor 250 causes transistors 258, 260 to conduct thereby energizing output coil 264. Prior to achieving the threshold level, the signal being generated by circuit 156 during the first period was correlated with the signal generated in the circuit 158 to produce a logical zero output signal. In this case, the output transistors 250, 258, 260 are rendered nonconductive and the coil 264 is deenergized.

During the second period, the rate of change of acceleration signal being generated by differentiator circuit 212 reaches the selected level for transistor 220 to switch its conductive state from that of period one. The lower leg 158 remains in this state for the second, third and fourth periods. However, the upper leg switches its output signal due to the fact that the acceleration has reversed when the wheel which was decelerating is now accelerating as indicated in the fourth period. During the fifth period, the transistors 168, 220 are conductive to provide the proper output signals for switching transistors 250, 258 and 260 to the off condition and deenergizing output coil 264. As was described above, the feedback signal from resistor 242 maintains the output transistors conductive until the rate of change of acceleration plus the delay built into the differentiator circuits 200 and 212 switches transistor 220 to the conductive state. This remains true until the first period when the wheel deceleration reaches a preselected magnitude.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a brake system for a vehicle including braking means for applying a braking force to at least one wheel of the vehicle and control circuit means for controlling said braking means by cyclically applying and releasing the braking force, the improvement comprising sensing means for sensing the angular velocity of the wheel, first means for deriving an acceleration signal in response to the sensed velocity, second means for deriving a rate of change of acceleration signal in response to the sensed velocity, first threshold means connected in responsive relation to said first means for generating a first control signal in response to said acceleration signal achieving a preselected value including threshold setting means fixing the threshold response of said first threshold means, and output control means correlating said acceleration and rate of change of acceleration signals and generating an output signal for controlling the control circuit during at least a portion of the braking cycle in response to said correlated signals.

2. The improvement of claim 1 wherein said portion of the braking cycle is the portion at which the braking force is applied.

3. The improvement of claim 1 wherein said first means generates a signal wave having at least one portion of a preselected first characteristic and said second means generates a signal wave having a second wave characteristic, said output signal being generated in response to the coincidence of said preselected first and said second characteristic.

4. The improvement of claim 3 wherein said first characteristic is the polarity of the signal wave.

5. The improvement of claim 3 wherein the second characteristic is a change in polarity of said signal wave.

6. The improvement of claim 5 wherein said first characteristic is the polarity of the signal wave.

7. The improvement of claim 6 wherein said output control means includes output gate means connected to said first threshold means and said second means, said output gate means generating said output signal in response to said first characteristic indicating an acceleration condition of the wheel and said second characteristic indicating a change in polarity of said rate of change of acceleration wave.

8. The improvement of claim 3 wherein said first means includes a first differentiator circuit connected to the velocity sensor for deriving an acceleration wave form having a characteristic expressed by $C\delta/\tau\delta+1$ in response to changes in the velocity and said second means includes a second differentiator circuit connected to said first differentiator circuit for deriving a rate of change of acceleration wave form having a characteristic expressed by $C\delta/\tau\delta+1$ in response to the rate of change of the rate of change of wheel velocity and said output gate means connected to respond to said first and second differentiator circuits and produce said output signal in response to a preselected polarity of the acceleration signal and a change in polarity of the rate of change of the rate of change of acceleration.

9. The improvement of claim 7 wherein said output gate responding to said first threshold means during a first portion of said brake cycle and to said correlated signals during a second portion of said cycle.

10. The improvement of claim 9 wherein said first portion is during the deceleration portion of the cycle and said output gate responds to a preselected magnitude of deceleration during said first portion, and said second portion is during the acceleration portion of the cycle and said output gate responds to said first signal generated by said first gate means.

11. The improvement of claim 1 further including secind threshold means connected in responsive relation to said second means for generating a second control signal in response to said rate of change of acceleration signal including variable threshold setting means for varying the response of said second threshold means, said variation of said second threshold means being adapted to act as a gate to said rate of change of acceleration signal.

12. The improvement of claim 11 further including feedback circuit means connected to said output control means and said variable threshold setting means for varying said variable threshold in response to said output signal.

13. The improvement of claim 12 wherein said second threshold means includes a controllable semiconductor device connected to said first means, said variable threshold setting means being connected to bias said semiconductor device and vary the response to said rate of change of acceleration signal of said semiconductor device.

14. The improvement of claim 13 wherein said variable threshold setting means includes a diode network having a fixed bias network and said feedback means connected thereto, said fixed bias network operating to control said semiconductor device during a first portion of the cycle and said feedback network operating to control said semiconductor device during a second portion of the cycle.

15. The improvement of claim 14 wherein said semiconductor device is a transistor having a base electrode connected to said diode network, and said output control means includes diode network gate having first and second diodes, one of said diodes being connected to said first threshold means and another of said diodes being connected to said second threshold means, said first and second diodes correlating said signals.

References Cited

UNITED STATES PATENTS 3,245,727   4/1966   Anderson et al.
3,398,995   8/1968   Martin.
3,467,444   9/1969   Leiber.

DUANE A. REGER, Primary Examiner

U.S. Cl. X.R.

303—20